US012692953B2

(12) United States Patent
O'Brien et al.

(10) Patent No.: US 12,692,953 B2
(45) Date of Patent: Jul. 28, 2026

(54) SELF-REGULATING STORM WATER CONTROL VALVE

(71) Applicant: STORMWIZARD, LLC, Saline, MI (US)

(72) Inventors: Joseph O'Brien, Saline, MI (US); Brandon Habin, Holden, MA (US)

( * ) Notice: Subject to any disclaimer, the term of this patent is extended or adjusted under 35 U.S.C. 154(b) by 0 days.

(21) Appl. No.: 18/628,426

(22) Filed: Apr. 5, 2024

(65) Prior Publication Data

US 2025/0314318 A1 Oct. 9, 2025

(51) Int. Cl.
    *F16K 31/122* (2006.01)
    *F16K 17/04* (2006.01)

(52) U.S. Cl.
    CPC ........ *F16K 17/046* (2013.01); *F16K 31/1223* (2013.01)

(58) Field of Classification Search
    CPC .. F16K 17/046; F16K 31/163; F16K 31/1221; F16K 31/1223; G05D 7/0133; Y10T 137/7923; Y10T 137/7869
    USPC ......... 251/63, 63.6, 63.5, 120–122; 137/538, 137/511–543.23, 561 R–565.36, 500, 501, 137/87.04, 460, 490; 405/39, 40; 138/40–46
    See application file for complete search history.

(56) References Cited

U.S. PATENT DOCUMENTS

| | | | | |
|---|---|---|---|---|
| 2,179,144 A | * | 11/1939 | Buttner ................... | F16L 29/00 |
| | | | | 137/515.5 |
| 2,307,949 A | * | 1/1943 | Phillips ................ | G05D 7/0133 |
| | | | | 251/282 |
| 2,821,209 A | * | 1/1958 | Waterman ............... | F16K 17/30 |
| | | | | 251/16 |
| 3,073,350 A | * | 1/1963 | Dillman ............... | G05D 7/0133 |
| | | | | 138/46 |
| 3,130,747 A | * | 4/1964 | Benaway ............. | G05D 7/0133 |
| | | | | 138/40 |
| 3,263,699 A | * | 8/1966 | Givler ................... | F01M 13/023 |
| | | | | 251/333 |
| 3,735,777 A | * | 5/1973 | Katzer .................... | F16K 17/04 |
| | | | | 137/516.29 |
| 3,958,596 A | * | 5/1976 | Garrard ................ | G05D 7/0133 |
| | | | | 137/504 |
| 4,437,493 A | * | 3/1984 | Okuda ................. | G05D 7/0133 |
| | | | | 137/504 |
| 4,510,993 A | * | 4/1985 | Luetzelschwab ..... | E21B 33/068 |
| | | | | 137/504 |
| 4,553,594 A | * | 11/1985 | Luetzelschwab .... | G05D 7/0133 |
| | | | | 166/305.1 |

(Continued)

*Primary Examiner* — Craig J Price

(74) *Attorney, Agent, or Firm* — Taft Stettinius & Hollister LLP

(57) ABSTRACT

A mechanical flow control valve for use in low pressure hydraulic systems, the valve includes a flow tube having an inlet and an outlet, a flow restrictor within a flow path, a fixed piston within the flow tube, a movable plunger assembly slidably attached to the fixed piston, the plunger assembly including a plunger head having a profile shape at least a portion of which increases toward the inlet. The movable plunger assembly is biased toward the inlet of the flow tube and is configured to move within the flow restrictor in response to one or more flow induced forces on the moveable plunger assembly thereby maintaining a target designed flow rate through the flow restrictor.

9 Claims, 8 Drawing Sheets

(56) References Cited

U.S. PATENT DOCUMENTS

| | | | | |
|---|---|---|---|---|
| 4,958,657 | A * | 9/1990 | Hagan | F16K 15/063 |
| | | | | 137/513.5 |
| 5,004,008 | A * | 4/1991 | Drucker | G05D 7/0133 |
| | | | | 137/493.2 |
| 5,158,109 | A * | 10/1992 | Hare, Sr. | F01L 1/08 |
| | | | | 188/322.22 |
| 5,240,036 | A * | 8/1993 | Morris | F16K 47/011 |
| | | | | 137/514.7 |
| 5,514,110 | A * | 5/1996 | Teh | A61M 5/16881 |
| | | | | 604/249 |
| 5,901,750 | A * | 5/1999 | Kozinski | G05D 7/0133 |
| | | | | 137/504 |
| 6,024,114 | A * | 2/2000 | Thomas | B60T 17/004 |
| | | | | 251/44 |
| 7,111,638 | B2 * | 9/2006 | Johnson | F16K 17/34 |
| | | | | 137/460 |
| 7,114,518 | B2 * | 10/2006 | Kirby | F16K 17/26 |
| | | | | 137/512.1 |
| 7,503,341 | B1 * | 3/2009 | Achterman | F16K 17/30 |
| | | | | 137/498 |
| 7,552,743 | B1 * | 6/2009 | Achterman | F16K 1/12 |
| | | | | 137/460 |
| 7,591,282 | B1 * | 9/2009 | Achterman | F16K 17/30 |
| | | | | 137/460 |
| 7,644,726 | B1 * | 1/2010 | Achterman | F16K 17/30 |
| | | | | 137/516.25 |
| 2014/0054486 | A1 * | 2/2014 | Fujiki | F16K 21/04 |
| | | | | 251/321 |

* cited by examiner

SELF-REGULATING STORM WATER CONTROL VALVE

FIELD OF INVENTION

The present invention relates to the field of hydraulic engineering, specifically to mechanical devices designed for flow control within hydraulic systems. It addresses the challenges associated with managing fluid flow in low head or low-pressure environments, such as stormwater discharge control from detention systems, wastewater treatment, and other low-pressure piping systems. The invention is particularly relevant to applications requiring precise flow rate control under varying hydraulic head conditions, without the need for external power sources or complex electronic control systems.

BACKGROUND OF THE INVENTION

The present invention pertains to hydraulic systems, especially those involved in water management, which often require precise control of fluid flow to ensure efficient operation and compliance with environmental regulations. Traditional flow control valves are electrically and/or electro-pneumatically controlled and typically designed for higher pressure systems and do not offer the necessary precision or reliability in low pressure environments. These low pressure environments are characterized by water pressures typically less than 15 feet of water column or 6.5 pounds per square inch gauge (psig) or (44.8 kPa), which are common in applications such as stormwater management and wastewater treatment.

The primary challenge in such systems is to maintain a consistent discharge flow rate despite fluctuations in the upstream water level or pressure. This is crucial in applications such as storm water management, where the controlled release of water is essential to prevent storm drainage system overload, ensure efficiency and to meet environmental and flood control regulations.

Existing solutions often rely on complex mechanisms or electronic controls, which can increase the cost, maintenance requirements, and energy consumption of the hydraulic system. Furthermore, these solutions may not provide the necessary reliability or precision in environments with low hydraulic head or pressure.

There is, therefore, a need for a flow control valve that can operate effectively in low pressure environments, offering precise control of the discharge flow rate without the need for external power sources or electronic control systems. Such a valve should be capable of adjusting its flow resistance in response to changes in the upstream water level or pressure, thereby ensuring a consistent flow rate under varying hydraulic conditions. The valve should also be designed to minimize maintenance requirements and operational costs, making it suitable for a wide range of water management and treatment applications.

SUMMARY OF THE INVENTION

The present invention relates to a fully mechanical flow control valve designed specifically for applications within low head/pressure hydraulic environments, such as detention systems, wastewater treatment, and low head/pressure piping systems. Operating under water pressures typically less than 15 feet water column or 6.5 pounds per square inch gauge (psig) or 44.8 kPa), the present invention is able to maintain a target discharge flow rate consistently, irrespective of fluctuations in water level or upstream water pressure.

Central to the invention is its fully mechanical design, which includes a flow tube or housing that directs fluid from the inlet to the outlet, and an orifice plate within this path that acts as the primary flow restrictor. The valve further includes a moveable plunger assembly having a plunger head that moves within the orifice plate to create a flow annulus that creates the primary flow restriction and uniquely adjusts the flow resistance via a movable plunger assembly, which changes position in response to flow-induced drag forces and differential head pressures. The movement of the plunger head is balanced against a compressible volume of air, controlled by a fixed piston, which acts like an air spring to absorb pressure fluctuations, ensuring steady flow rates.

The valve's plunger assembly is designed to minimize friction and prevent sticking, incorporating a low friction sleeve liner and a low friction piston equipped with an O-ring. This assembly is adjustable for different operational scenarios, including constant submerged conditions. A notable feature of the design is the proportional relationship between the piston and the plunger sleeve lengths, optimizing the movement of the assembly's center of gravity to reduce friction and prevent cantilever-induced racking.

This invention provides a reliable, maintenance-friendly solution for precise flow control in low-pressure hydraulic systems, eliminating the need for external power or complex electronic controls. Its mechanical design ensures durability and consistent performance, making it an ideal choice for water management and treatment applications requiring stringent flow regulation under varying hydraulic conditions.

DETAILED DESCRIPTION OF THE INVENTION

Figure 1:
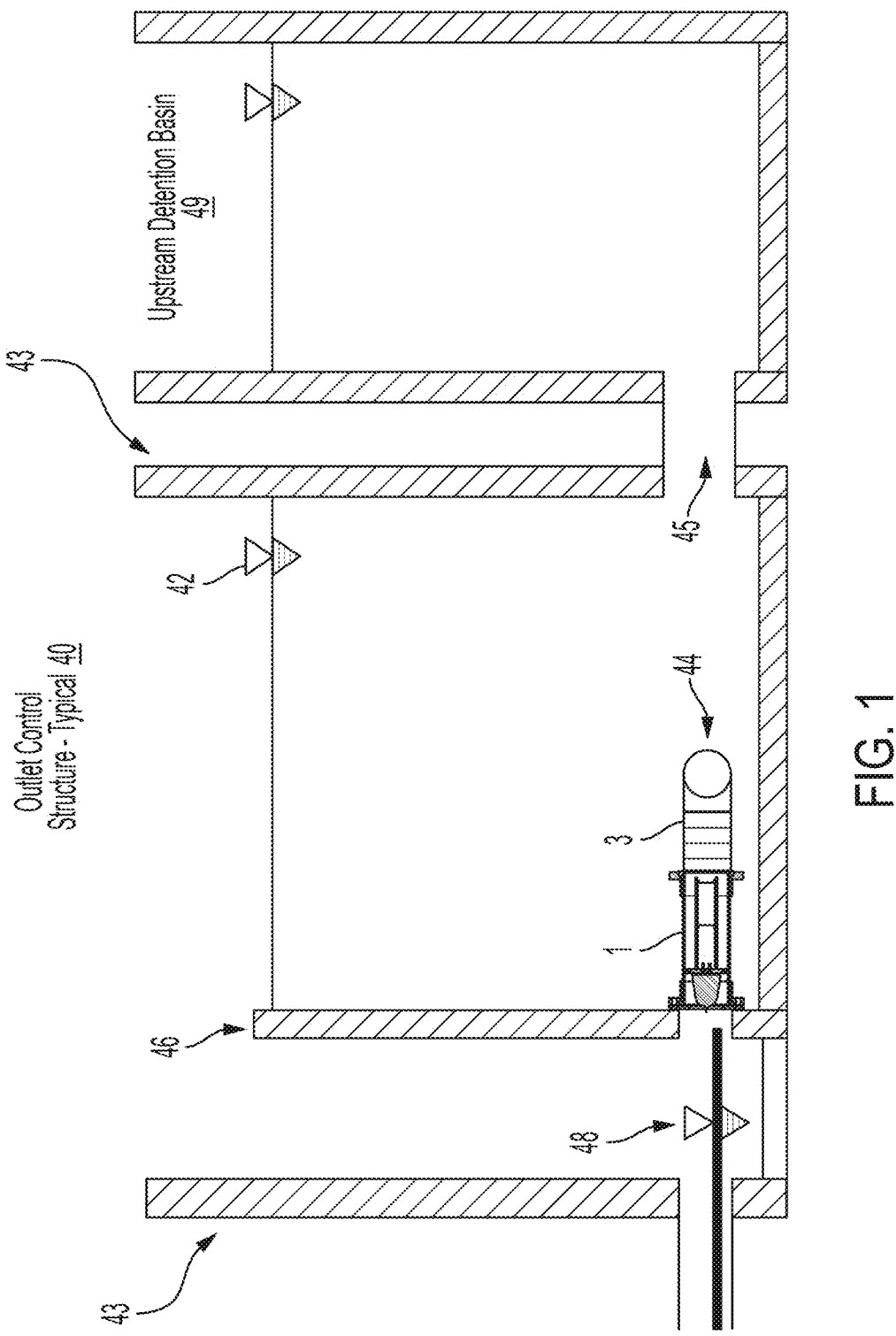
FIG. 1 depicts a side cross-sectional view of the flow control valve according to the embodiment of FIGS. 2-5B illustrating use in controlling storm water discharge.
Figure 2:
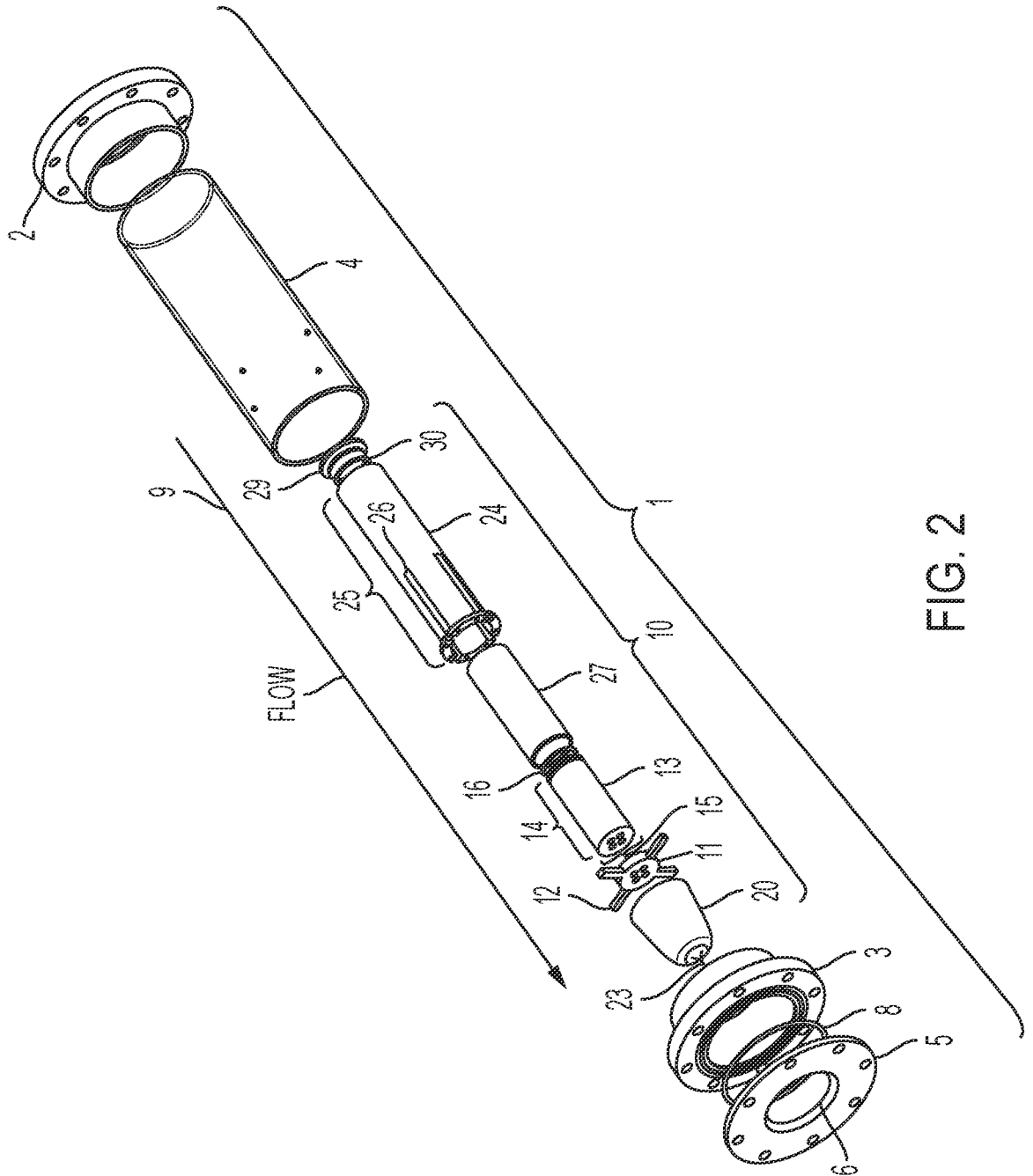
FIG. 2. shows an exploded isometric view of an embodiment of the flow control valve.
Figure 3:
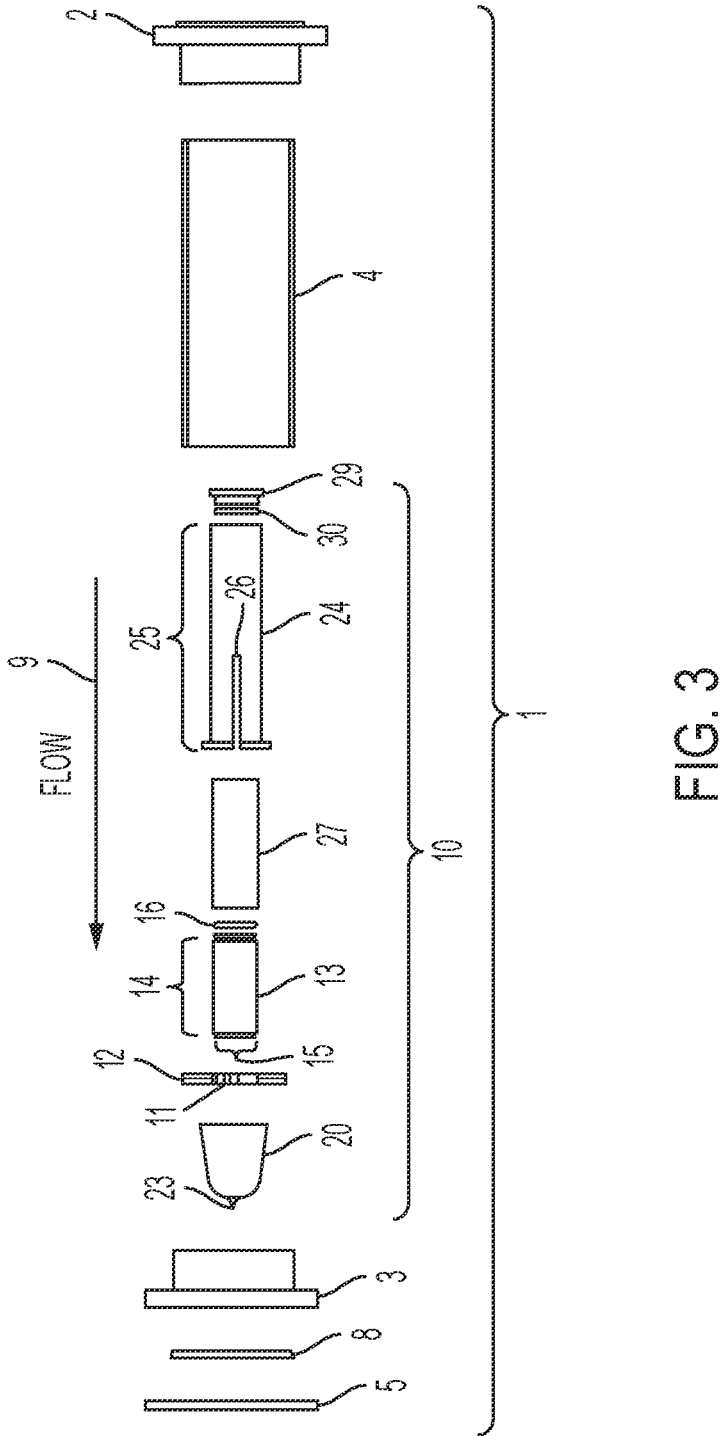
FIG. 3. shows an exploded side view of the flow control valve in FIG. 2.

The invention is a fully mechanical self-regulating storm water flow control valve for use in low head/pressure hydraulics (water pressures typically <15 ft water column/<6.5 psig) or (44.8 kPa). It is noted that "head" and "pressure" are synonymous within this description. FIG. 1 shows a preferred embodiment of the valve 1 in a typical outlet control structure 40 downstream from a stormwater retention/detention basin 49 with a variable water elevation. The water elevation 42 within the outlet control structure 40 varies with the inflow from the upstream detention basin 49. The outlet control structure 40, generally comprises an outlet control structure wall 43, with an inlet 45 in fluid connection to the upstream detention basin 49. The inlet 45 is on the upstream portion of the outlet control structure 40, and a weir 46. The inlet of the valve can be attached to an inlet pipe 44, which can have an elbow and act as a flow straightener and further include a screen to filter out large particles. Or, the valve 1 can be used without the pipe and a screen can be attached to the inlet side of the valve 1. The outlet of the valve 1 is a free discharge 48 to atmosphere downstream of the valve 1, or within a low head/pressure piping system. The valve may also be used with a constant or variable downstream/outlet pressure to maintain a constant flow. The operation of the valve is designed to maintain a target discharge flow rate, regardless of differential pressure created by the upstream water level 42 and the downstream water level 48 within the outlet control structure 40.

The valve 1 is comprised of a number of components illustrated in FIGS. 2-5A. A flow tube 4 provides a flow path between an inlet flange 2 and an outlet flange 3 (inlet flange 2' and outlet flange 3' in FIG. 5A). An orifice plate 5 is attached to the outlet flange 3 with an O-ring 8 between the outlet flange 3 and the orifice plate 5. The orifice plate 5 has an orifice 6 having an orifice diameter 7, the orifice plate 5 provides the primary method of flow resistance against the valve inlet head. The valve 1 further comprises a plunger assembly 10 within the flow tube 4, the plunger assembly 10 comprises a stationary portion and a movable portion.

The stationary portion of the plunger assembly 10 comprises an attachment plate 11 (FIGS. 2 and 3) having legs 12 (FIG. 4) that attach to the interior wall of the flow tube 4, the legs 12 allowing flow through the tube. The embodiment shown in FIGS. 2-4 has four legs 12, however, one of ordinary skill in the art would understand that any number of legs to provide a fixed support can be used. Attached to the attachment plate 11 on the inlet flange 2 side of the attachment plate 11 is a fixed low friction piston 13. The low friction piston 13 having a piston length 14 and a piston diameter 15.

The moveable portion of the plunger assembly 10 comprises a plunger head 20 on the outlet flange 3 side of the attachment plate 11. The plunger head 20 having a distal plunger head tip 23 near the orifice 6 and a variable diameter of the outer surface 21 that increases as it moves away from orifice 6. The shape of the plunger head is advantageously terminated with an extended tip 23 that extends near and or past the orifice axial location when the movable portion of the plunger is in its fully retracted position, which improves stability and avoids downstream flow fluctuations that may impact the performance of the valve.

The plunger head 20 is moveably attached to the piston 13 via a piston sleeve 24. The piston sleeve 24 has cut outs 26 that correspond to the attachment plate legs 12 so that it can slidably move along the piston 13 past the legs 12 towards the orifice 6. The piston sleeve 24 is then attached to the plunger head 20. The moveable portion of the plunger assembly 10 further advantageously contains a low friction sleeve liner 27 disposed between the piston 13 and the piston sleeve 24. Depending on the materials used, not all applications will require the low friction sleeve liner 27. An O-ring 16 is attached to the piston 13 and forms a seal between the piston and the low fiction sleeve liner 27. In addition an end cap 29 is sealed to the piston sleeve 24 or sleeve liner 27 with an O-ring 30. The piston 13, piston sleeve liner 27 and piston end cap 27 defining a compressible air volume 31.

In the preferred embodiment, the low friction sleeve liner 27 helps prevent sticking and adverse performance. Furthermore, in the preferred embodiment the end cap 29 has a provision to allow for pre-charging and venting the compressible volume 31. This can be used in many applications, including for use in constant submerged scenarios. Also, in the preferred embodiment, the piston 13 will have a piston length 14 that is approximately half of the piston sleeve length 25. This is designed such that the movement of center of gravity of the plunger assembly moves about the center of gravity of the supporting piston instead of cantilevering out from the center of gravity of the piston. This design further reduces friction between the components when moving, and further reduces the potential for cantilevered induced racking while moving.

In operation, as the differential head 42-48 increases between the inlet and outlet of the valve, flow induced drag forces on a movable plunger assembly change the position of the plunger head 20 inside the orifice 6 to further restrict the flow through the orifice plate 5. The flow induced drag forces, include, but are not limited to, flow against the piston end cap 29, the exterior of the piston sleeve 24, and around the plunger head 20. The movable plunger assembly acts against the compressible volume of air 31 via the fixed piston 13 fixed with the attachment plate 11 to the flow tube 4. While the preferred embodiment uses the compressible volume of air 31 as a spring, one of ordinary skill in the art would recognize that other compressible fluids can be used or even a mechanical spring or other biasing member could be used to actuate the movable plunger assembly. This compressible volume 31 acts as an air spring, absorbing fluctuations in the pressure to maintain a constant flow through the valve 1. The differential pressure and flow induced drag acting on the movable plunger change the travel position of the plunger. The forces acting to compress or decompress the air volume 31 are the sum of the static pressure outside the piston cylinder, pressure loss across the plunger, and the drag on the movable plunger body.

The interface between plunger head 20 and orifice plate 5 create a flow annulus resulting in variable flow restriction, thereby controlling the flow rate under varying head conditions. The plunger head profile 20 is shaped such that the radius of the plunger head 21 relative to the orifice 6, changes in correspondence to changes in differential pressure to yield a variable sized flow annulus to achieve the target designed flow rate. This is accomplished by movement of the plunger assembly 10 toward the orifice 6 during conditions of increasing flow/differential pressure through the valve 1, and movement of the plunger assembly 10 away from the orifice 6 under conditions of decreasing flow/differential pressure through the valve 1. When flow/differential pressure through the valve 1 returns to zero, or it's static starting pressure if submerged, the force inside the compressible volume 31 acts to decompress the cylinder and return the plunger assembly 10 to its starting position.

The sleeve liner 27 is typically made from materials such as Polytetrafluoroethylene (PTFE), Ultra High Molecular Weight Polyethylene (UHMWPE), Acetal, or graphite. The piston 13 is typically made from the same material as the liner but is not required to be. All other components such as the flow tube 4 can be many different materials-PVC, aluminum, steel, stainless steel, etc. However, an important aspect of the present invention is that the movable plunger assembly 10 is as light as possible to limit wear and racking, and to aid in the best performance of the valve 1 as possible.

Figure 4A:
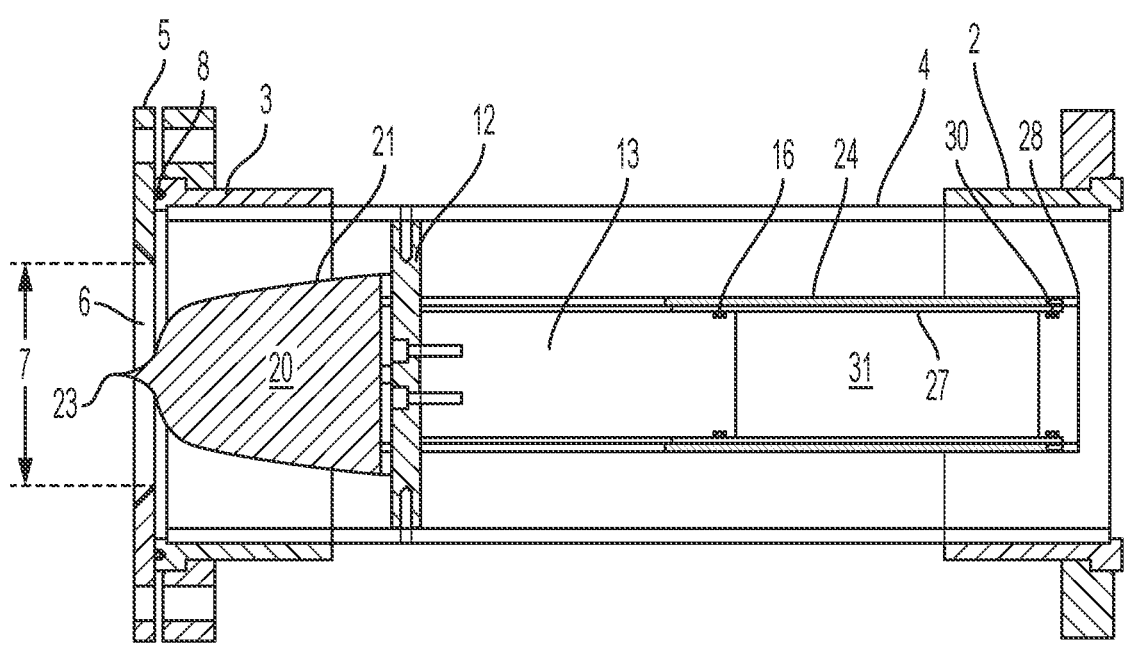
FIG. 4A. shows an assembled side cross-section view of the flow control valve of FIGS. 2-3 in a resting state.
Figure 4B:
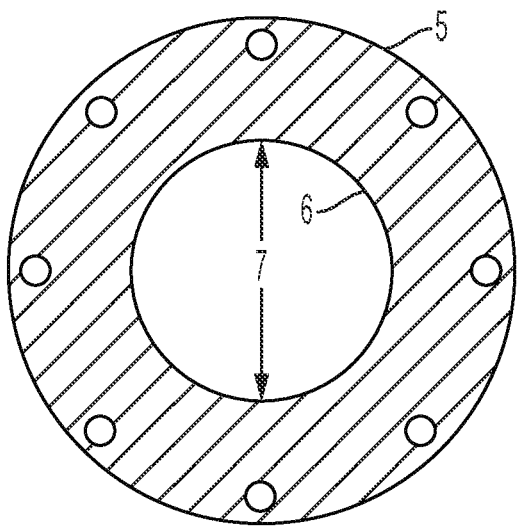
FIG. 4B. shows a front view of the flow control valve of FIG. 4A.

FIGS. 4A and 4B shows the flow control valve in a static resting state/starting position, where the valve 1 is experiencing little to no flow. As shown in FIG. 4B, the orifice diameter 7 of the orifice 6 is completely open. However, it is understood that the plunger head could start slightly within the orifice 6 as well, reducing the orifice diameter 7.

Figure 5A:
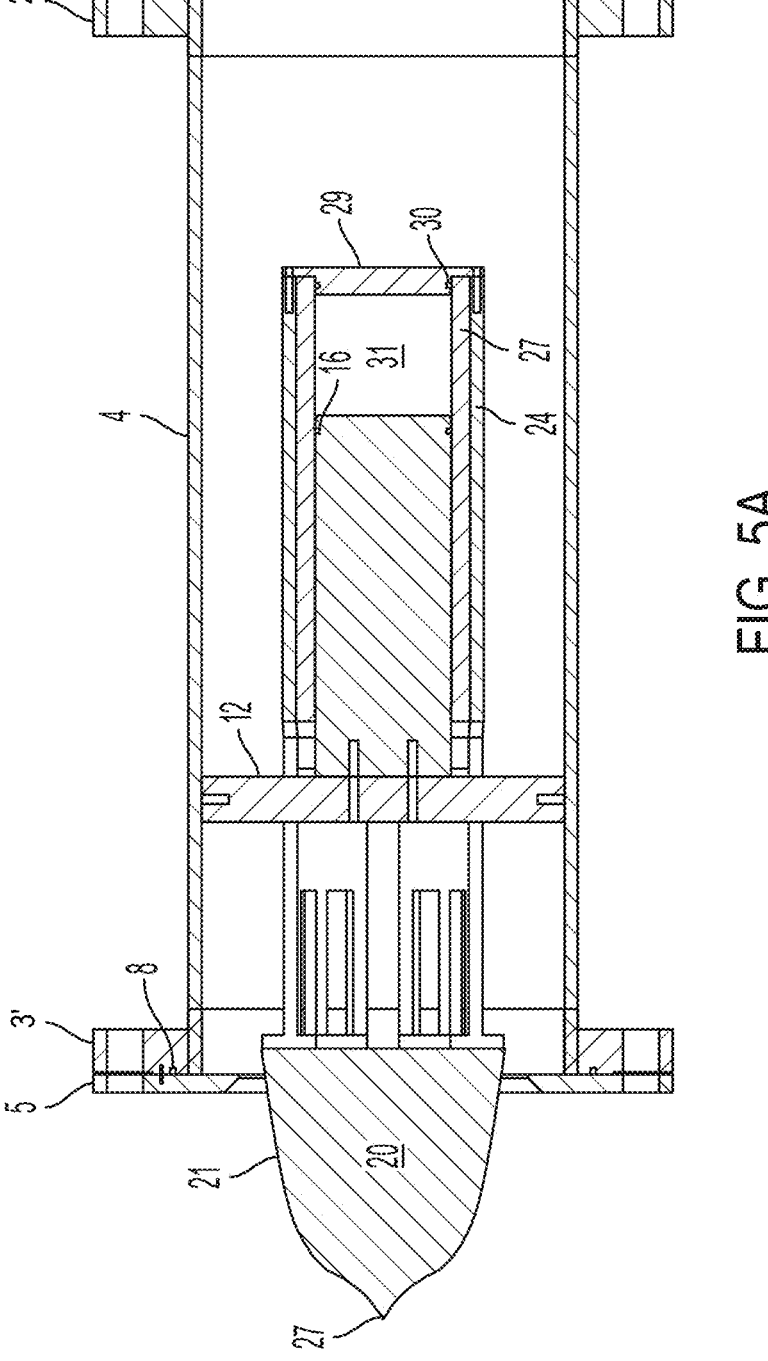
FIG. 5A. shows a side cross-section view of the flow control valve of FIG. 4A in an actuated state.
Figure 5B:
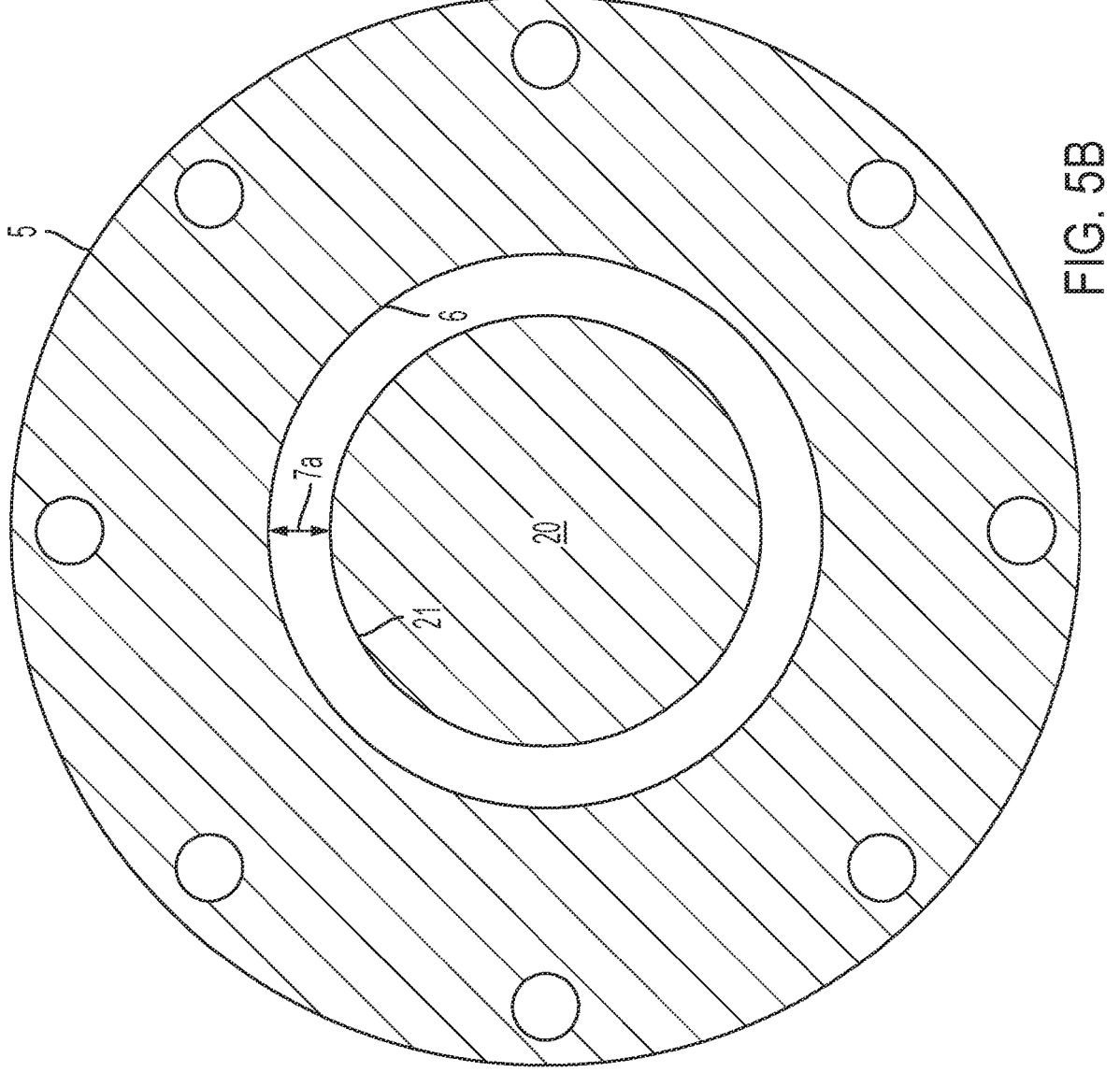
FIG. 5B. shows a front view of the flow control valve of FIG. 5A.

FIGS. 5A and 5B show the flow control valve in an at least partially actuated state, where the valve 1 is experiencing enough flow through the flow tube 4 that the plunger 20 has been actuated into the orifice 6. As shown in FIG. 5B, the orifice diameter 7a has been reduced from that of the starting position thereby further restricting flow through the valve 1. The orifice diameter from starting state to fully actuated state is determined by the shape of the plunger head 20, which can be modified to achieve different discharge rates.

For most applications, the valve 1 flow tube 4 size typically ranges from 4 inches to 18 inches or (10.16 to 45.72 cm) in diameter. Furthermore, for best operation the movable plunger should have a total length to mass ratio small enough to be supported by the fixed piston as to prevent excessive bending forces, racking, or binding for an entire stroke of the movable plunger.

Additional preferred sizing for the valve 1 components are that the maximum cross-sectional area of the plunger head 20 is smaller than the cross-sectional area of the orifice 6. The maximum cross-sectional area of the plunger head 20 is preferably less than or equal to 75% of the flow tube 4 cross-sectional area. The fixed piston 13 preferably has a cross-sectional area that is 75-90% the maximum cross-sectional area of the plunger head 20.

Figure 6:
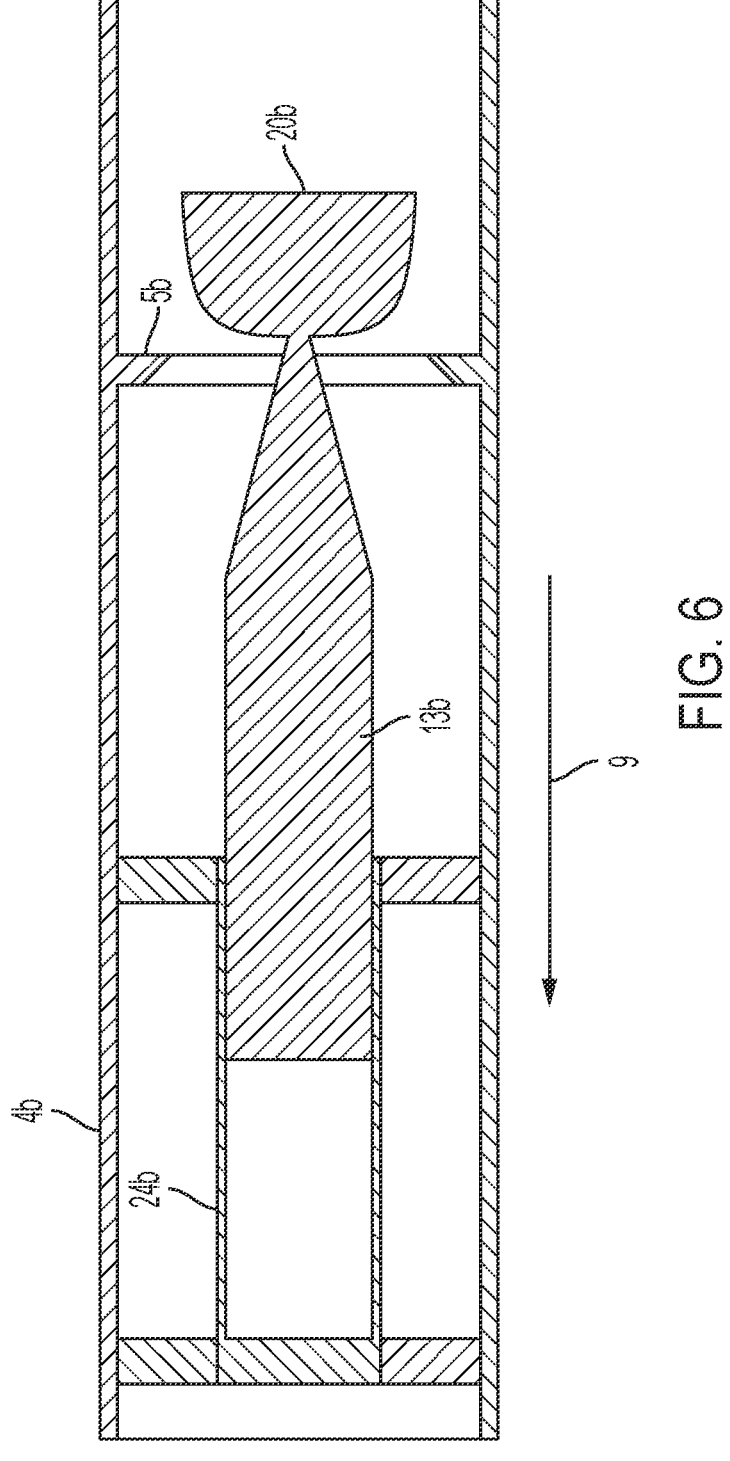
FIG. 6 show an alternate embodiment of the flow control valve.

FIG. 6 shows an alternate embodiment of the flow control valve wherein the plunger head 20b is upstream of the orifice plate 5b, while the piston 13b is movable and the piston sleeve 24b is fixed downstream of the orifice plate 5b. In this embodiment, the piston sleeve 24b is affixed to the walls of the flow tub 4b and the plunger head 20b is attached to the sliding piston 13b. In this embodiment, most of the flow induced forces are on the back face of the plunger head 20b, which pushes the plunger head 20b into the orifice.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

REFERENCE NUMBER KEY

1—Flow Control Valve
2—Inlet Flange
3—Outlet Flange
4—Flow Tube
5—Orifice plate
6—Orifice
7—Orifice Diameter
8—Orifice Plate O-ring
9—Flow
10—Plunger Assembly
11—Attachment Plate
12—Legs
13—Low Friction Piston
14—Piston Length
15—Piston Diameter 16—Piston O-Ring
20—Plunger Head
21—Plunger Head Outer Surface
23—Plunger Head Tip
24—Piston Sleeve
25—Piston Sleeve Length
26—Piston Sleeve Cut Outs
27—Low Friction Sleeve Liner
29—End Cap
30—Piston End Cap O-Ring
31—Compressible Air Volume
40—Outlet Control Structure
42—Inlet Water Elevation
43—Outlet control structure wall
44—Inlet Pipe
45—Basin Inlet
46—Weir
48—Discharge Water Elevation
49—Upstream Detention Basin
4b—Flow Tube
5b—Orifice
13b—Piston
20b—Plunger Head
24b—Piston Sleeve

What is claimed is:

1. A mechanical flow control valve for use in low pressure hydraulic systems, the valve comprising:
   a flow tube having an inlet and an outlet;
   a flow restrictor within a flow path;
   a fixed piston within the flow tube;
   a movable plunger assembly slidably attached to the fixed piston, the moveable plunger assembly including a plunger head having a profile shape at least a portion of which increases toward the inlet, wherein the moveable plunger assembly and the fixed piston create a compressible air volume used to bias the moveable plunger assembly; and
   a low friction sleeve liner between the moveable plunger assembly and the fixed piston;
   wherein the movable plunger assembly is biased toward the inlet of the flow tube; and
   wherein the movable plunger assembly is configured to move within the flow restrictor in response to one or more flow induced forces on the moveable plunger assembly, thereby reducing flow through the flow restrictor.

2. The mechanical flow control valve according to claim 1, wherein the low friction sleeve liner and the fixed piston are the same material.

3. The mechanical flow control valve according to claim 2, wherein the low friction sleeve liner and the fixed piston are made of Ultra High Molecular Weight Polyethylene (UHMWPE), Polytetrafluoroethylene (PTFE), Acetal, or graphite.

4. The mechanical flow control valve according to claim 1, wherein the fixed piston has a piston length; and the movable plunger assembly further comprises a piston sleeve having a piston sleeve length that is approximately twice that of the piston length.

5. The mechanical flow control valve according to claim 4, wherein the movable plunger assembly has a total length to mass ratio small enough to be supported by the fixed piston as to prevent excessive bending forces, racking, or binding for an entire stroke of the movable plunger assembly.

6. The mechanical flow control valve according to claim 5, wherein the maximum cross-sectional area of the plunger head is smaller than the cross-sectional area of the flow restrictor.

7. The mechanical flow control valve according to claim 6, wherein the flow tube has a cross-sectional area and wherein the maximum cross-sectional area of the plunger head is less than or equal to 75% of the flow tube cross-sectional area.

8. The mechanical flow control valve according to claim 7, wherein the fixed piston has a cross-sectional area that is 75-90% the maximum cross-sectional area of the plunger head.

9. The mechanical flow control valve according to claim 8, wherein the flow tube has an inside diameter less than or equal to 18 inches.

\* \* \* \* \*